United States Patent Office 3,202,726
Patented Aug. 24, 1965

3,202,726
RECOVERY OF DIMETHYLNAPHTHALENES
Earl W. Malmberg, Wilmington, Del., and William M. Robinson, Holmes, Pa., assignors to Sun Oil Company, Philadelphia, Pa., a corporation of New Jersey
No Drawing. Filed July 3, 1961, Ser. No. 121,338
11 Claims. (Cl. 260—674)

This invention relates to the recovery of dimethylnaphthalenes from aromatic petroleum fractions containing the same, and more particularly to the recovery of selected isomers from other isomers in the aromatic fractions.

In one embodiment, the invention involves the recovery of 2,6-dimethylnaphthalene in a concentrated or purified form from an aromatic hydrocarbon fraction containing the 2,6 and various isomers thereof. In another embodiment, the invention involves the recovery of a mixture of 2,6- and 2,7-dimethylnaphthalene from fractions containing other isomers. In another embodiment, the invention involves the recovery of 2,3-dimethylnaphthalene from fractions containing other isomers. In other embodiments, other isomers are selectively recovered from petroleum fractions.

The recovered isomers are useful for various purposes as known in the art. For example, the dimethylnaphthalene may be partially oxidized to produce dicarboxylic acids or other oxidation products. In the case of the 2,6 isomer, the diacid produced therefrom by oxidation is particularly useful for the preparation of polyesters by reaction with ethylene glycol, for example. The resulting polyesters are useful for the preparation of fibers and for other uses.

Mixtures of 2,6- and 2,7-dimethylnaphthalene can be oxidized to produce mixtures of 2,6- and 2,7-naphthalene dicarboxylic acid. The diacid mixture can be esterified, for example with methanol, and the esters separated by known procedure to obtain separately the esters of the 2,6-diacid and the 2,7 diacid.

The present invention involves a separation method whereby a dimethylnaphthalene isomer or isomers is recovered from other isomers by procedure involving in one embodiment the cooling of a mixture of dimethylnaphthalene isomers to precipitate a solid material containing one or more of the isomers, e.g. the 2,6, in a concentrated but still crude form. The resulting slurry is then subjected to procedure for separation of solid material from liquid material, while raising the temperature in order to produce additional liquid material from the originally precipitated solid material. The separation of solid material from liquid material will be referred to in the following description as filtration, and this is a preferred manner of accomplishing the separation, though others may be used.

The feed stock for the procedure according to this embodiment of the invention is a hydrocarbon fraction containing a substantial amount of the dimethylnaphthalene isomer to be recovered. Typically the feed stock contains at least 80%, preferably at least 90%, of aromatic hydrocarbons. In the embodiment where 2,6-dimethylnaphthalene is to be recovered, the content of this isomer in the feed stock is typically in the range from 10 to 40 wt. percent, preferably 15 to 30 wt. percent.

Examples of suitable feed stocks are various highly aromatic fractions produced in petroleum refining and conversion processes. Higher boiling aromatic fractions produced in reforming of petroleum naphtha to produce high octane gasoline, are examples of such feed stocks. Aromatic fractions produced by the thermal cracking of catalytically reformed gasoline; aromatic fractions produced by the catalytic cracking of thermally reformed naphtha; and aromatic concentrates obtained from catalytic gas oil produced in catalytic cracking of petroleum; are additional examples of suitable feed stocks. The latter concentrates can be prepared for example by solvent extraction, e.g. with furfural, by selective adsorption, or by other known processes. Aromatic hydrocarbon fractions from coal tar or other sources can be employed in place of petroleum fractions.

In order to concentrate a given isomer or isomers in the feed stock, it is usually desirable to obtain a relatively narrow boiling distillate fraction for use as the feed stock for the crystallization. In the case of 2,6-dimethylnaphthalene, a distillate fraction having boiling range of approximately 500 to 510° F., or some narrower boiling range within the range of 500 to 510° F., is preferred. In the case of 2,3-dimethylnaphthalene, a fraction boiling in the range from 510 to 520° F. is generally preferred.

According to one embodiment of the invention, the feed stock is heated to a sufficiently high temperature to obtain solution of normally solid components in the liquid phase. In the case of typical fractions boiling in the range from 500 to 510° F. and containing 15 to 30 wt. percent of 2,6-dimethylnaphthalene for example, the fraction at room temperature is a slurry containing solid components as well as liquid components. The extent of heating necessary to obtain solution of such solid components may readily be determined by a person skilled in the art. The temperature varies depending upon the starting material, and in some cases no heating is required to obtain complete solution.

The feed stock is then cooled to crystallize solid material constituting a crude concentrate of the isomer or isomers to be recovered. Preferably the temperature of crystallization is in the range from —50° C. to 50° C., more preferably in the range from —10° C. to 30° C. At relatively high crystallization temperatures, the crystals contain a smaller proportion of the initial desired isomer, but with less impurities to remove by the subsequent heating and filtration.

Preferably the crystallization is carried out in the absence of an added solvent, and one of the advantages of the present invention is that highly satisfactory recovery of desired isomers can be obtained by crystallization and subsequent procedure without the use of a solvent. It is within the scope of the invention, however, to employ a solvent in the crystallization, and the known solvents for crystallization of aromatic hydrocarbons are generally satisfactory.

The crystallization period is usually in the range from 2 to 5 hours, although satisfactory results can be obtained with other crystallization periods. Relatively long periods usually result in a relatively great amount of crystals but a lesser proportion of the desired isomer in the crystals. Any crystallization procedure which produces crystals of sufficient size for subsequent separation of crystals from liquid is suitable, and the person skilled in the art can select suitable procedures in the light of the present specification.

Following the crystallization, the slurry is filtered while raising the temperature thereof, and the liquid material produced by the heating is preferably continuously removed by the filtration procedure during the heating. The rise in temperature in the heating is preferably at least 10° C., and more preferably at least 25° C. In some instances, rises in temperature of 100° C. or higher are employed.

The rate of heating can be chosen by a person skilled in the art in the light of the present specification. In a typical example, the temperature may be raised from room temperature to 50° C. over a 20 to 30 minute period, and subsequently from 50° C. to 80° C. over a one hour period. The rate of heating depends upon the circumstances in a given case, but will usually be over a period ranging from 15 minutes to five hours.

The temperature to which the solid material is ultimately heated is preferably in the range from 25 to 100° C., more preferably 60 to 90° C. where the desired product is 2,6-dimethylnaphthalene or its 2,7 isomer. The optimum temperature may vary according to the isomer to be recovered. Generally, the higher the final temperature, the more pure will be the final solid product with respect to the desired isomer; on the other hand, the lower generally will be the yield of the desired isomer in the final solid product.

The heating is preferably performed while subjecting the solid material to a pressure in the range from 25 to 500 p.s.i.g., more preferably 50 to 250 p.s.i.g., in order to force liquid from the solid and maintain the latter in a substantially liquid-free condition during the heating. Suitable means can be provided to remove the liquid through a porous medium, at the bottom, for example, of the zone in which the solid material is subjected to the heating and pressure. Without use of superatmospheric pressure, the optimum purity of the desired isomer is not obtained. Removal of liquid material from the solids is essential during the heating, since otherwise excessive liquefaction of the desired high melting isomer or isomers takes place.

Typically, the slurry initially obtained upon crystallization is filtered at the crystallization temperature and under pressure in the ranges noted above, and the temperature is subsequently raised while maintaining the pressure. The use of elevated pressure during the initial filtration, and the maintenance of substantially constant temperature during the initial filtration are not essential however, and various procedures can be employed provided that they involve at some stage the raising of the solids while subjecting them to elevated pressure to force out liquefied material.

The filtrate which is obtained in the filtration or filtrations can be suitably treated for the recovery of additional desired isomer therefrom. In the filtrates which are obtained at relatively low temperatures, the amounts of the desired isomer therein are relatively low. These filtrates can be subjected to fractional crystallization to obtain a solid material which is more concentrated with respect to the desired isomer, and the solid material obtained in such crystallization can be recycled to the operation according to the invention. Filtrates which are obtained at relatively high temperatures in the procedure according to the invention can in some instances be directly recycled to the crystallization step of the process according to the invention.

By heating to relatively high temperatures, e.g. at least 75° C., it is possible to obtain final solid products which are highly concentrated with respect to 2,6-dimethylnaphthalene. Heating to lower final temperatures results in a final solid product which contains a greater ratio of 2,7-dimethylnaphthalene to the 2,6 isomer, but which is very highly concentrated with respect to the 2,6 and 2,7 isomers as compared with other isomers; products consisting essentially of these two isomers are readily obtainable in yields for example of 60 to 75%.

In one embodiment of the invention, the solid material obtained by filtration of the slurry produced upon crystallization, is washed with a solvent at a suitable temperature stage of the process, e.g. in the range from 0 to 50° C., preferably 20 to 30° C., although washing at other temperature levels may be performed. 0.5 to 2 volumes of solvent per volume of solid material are preferably employed, but other amounts can be used. The washing with solvent may involve the mixing of the filtered solids with solvent at a given temperature, e.g. room temperature, followed by pressing of solvent from the mixture at the same temperature by subjection to filtration at elevated temperature. Subsequently the filtered solids can be heated in accordance with the procedure previously described, while pressing the resulting liquid and residual solvent from the solid material. In some instances at least, the presence of residual solvent in the solid has a beneficial effect upon the subsequent heating and removal of liquid material.

In some instances, washing with solvent after the crystallization and initial filtration and before the heating to the final temperature, results in greater yield and purity of desired isomer in the final solid; in other instances, the reverse effect is obtained. Where the feed stock contains a relatively high percentage of 2,6-dimethylnaphthalene, e.g. over 20 wt. percent, superior recovery of 2,6-dimethylnaphthalene has been obtained when solvent washing is used. Where the feed stock contains a relatively low percentage of 2,6-dimethylnaphthalene, e.g. under 18 wt. percent, superior recovery has been obtained when solvent washing is not used. Where the feed contains 18 to 20% 2,6-dimethylnaphthalene, approximately equivalent results are obtained with and without solvent washing.

It is also within the scope of the invention to perform a crystallization from solvent at an intermediate stage in the operation according to the process of the invention. Thus for example, after crystallizing to form slurry and filtration of liquid from the slurry, the solids may be dissolved in a solvent at elevated temperature and the resulting solution cooled to produce crystallized solids. The latter may then be subjected to filtration while raising the temperature in the manner previously described and pressing to force out liquefied material.

The following examples illustrate the invention:

A series of experiments is performed in which a crude solid 2,6-dimethylnaphthalene is crystallized from a dimethylnaphthalene distillate concentrate from a highly aromatic petroleum fraction, and the solid is heated and subjected to pressure to force liquid from the cake.

The following Tables 1 and 2 show the conditions and results for the various experiments, and Table 3 shows the boiling range, source, and composition of the feedstocks used in the various experiments.

The procedure in each run except Run A involves heating the distillate concentrate to a temperature sufficient to put all solid material into solution, cooling the concentrate to form crude solid 2,6-DMN, placing the resulting slurry in a cylindrical press having a porous steel filter plate at the bottom, and applying pressure by means of a plunger to force liquid through the plate. In some experiments, the resulting filter cake is heated in the press while maintaining pressure by means of the plunger to force out liquid formed during the heating. In other experiments, the filter cake is removed from the press and mixed with solvent, e.g. ethanol, to form a slurry, and the latter is re-introduced into the press and heated therein while maintaining pressure. In Run A, manual pressure is applied to the filter cake by means of a spatula on an open filter, instead of using the press referred to above.

TABLE 1

| Run No. | Feed | | Procedure | Wt. product, g. | Percent, composition | | Percent recovery, 2,6- |
|---|---|---|---|---|---|---|---|
| | No. | Amount | | | 2,6- | 2,7- | |
| A | 1 | 4 ml | Cryst. at 0°; press, 0 to 70° | 0.37 | 91 | 9 | 36 |
| B | 2 | 50 ml | Cryst. at 0°; press, 0° | 16.04 | 37 | 28 | 76 |
| C | 3 | 19.4 g | Cryst. at 25°; press, 25 to 70° | 2.5 | 77 | 21 | 36 |
| D | 2 | 50 ml | Cryst. at 0°; press, 0°; filtrate. Press: | *24.31 | *9 | *13 | *28 |
| | | | 0 to 20° | *5.31 | *7 | *12 | *5 |
| | | | 20 to 40° | *4.07 | *13 | *18 | *7 |
| | | | 40 to 60° | *5.70 | *21 | *25 | *15 |
| | | | 60 to 80° | *2.91 | *37 | *38 | *14 |
| | | | Final crystals | 2.92 | 89 | 11 | 33 |
| E | 4 | 50 ml | Cryst. at 0°; press, 0 to 80° | | 85 | 15 | 27 |

TABLE 2

| Run No. | Feed | | Procedure | Wt. product, g. | Percent, composition | | Percent recovery, 2,6- |
|---|---|---|---|---|---|---|---|
| | No. | Amount | | | 2,6- | 2,7- | |
| F | 4 | 50 ml | Cryst. and press 25° | | 43 | | 46 |
| | | | Wash with equal wt. EtOH, 25°; to 50° in press | | 68 | | 40 |
| | | | To 80° in press | 2.23 | 93 | 7 | 26 |
| G | 2 | 25 ml | Cryst. and press 0°; wash with equal quantity MeOH, 25°; press, 25°. | 3.34 | 63 | 29 | 56 |
| H | 2 | | Cryst., press, 0°; wash with equal quantity EtOH 25°. | | 43 | 30 | 73 |
| | | | To 80° in press | | 84 | 16 | 26 |
| | | | To 90° in press | | 89 | 11 | 19 |
| I | 4 | | Cryst. at 25°; wash with equal quantity EtOH 25°; to 80° in press. | | 91 | 9 | 27 |
| | | | To 90° in press | | 95 | 5 | 21 |
| J | 5 | | Cryst. at 25°; wash with equal quantity EtOH 25°; to 80° in press. | | 94 | 6 | 24 |
| | | | To 90° in press | | 96 | 4 | 21 |

TABLE 3

*Feedstocks*

| Number and boiling range | Source | Percent, composition | | Ratio, 2,6/2,7- |
|---|---|---|---|---|
| | | 2,6- | 2,7- | |
| (1) 505–508° F | Hydroformer bottoms; 30-plate. | 20.0 | 19.1 | 51/49 |
| (2) 500–510° F | Catalytic gas oil (II) aromatic extract; 30-plate. | 15.7 | 14.1 | 53/47 |
| (3) 500–509° F | Catalytic gas oil (I) aromatic extract; 50-plate. | 28.1 | 20.6 | 59/41 |
| (4) 502–508° F | Catalytic gas oil (II) aromatic extract; 50-plate. | 23.2 | 22.7 | 51/49 |
| (5) ca. 504–508° F | Hydroformer bottoms; 25-plate. | 19.1 | 15.9 | 55/45 |

The starred numbers in the tables refer to filtrates obtained in pressing at the indicated conditions. Other numbers refer to the solid products remaining after pressing out liquid filtrate.

In Tables 1 and 2, temperatures are in degrees C. In all runs except A, C and E, the pressing is at 100 p.s.i.g. In Run A, the pressing is manual, with a spatula, as noted previously. In Run C, the pressing is at 75 p.s.i.g., and in Run E at 200 p.s.i.g. In the tables, "Press 0 to 70°," for example, means that the solids are heated from 0 to 70° C. under substantially constant pressure, e.g. 100 p.s.i.g. in Run B.

In Table 3, the "plate" designation is a measure of the efficiency of the distillation used in making the concentrate.

In Run F referred to in the table, the concentrate, after heating to about 60° C. to obtain complete solution of components, is cooled to room temperature (indicated as 25° C. in the table) and allowed to stand for 24 hours, then pressed at room temperature for 1.5 hours at 100 p.s.i.g. pressure to remove liquid. The filtered solids remaining in the press contain 43 wt. per cent 2,6-dimethylnaphthalene, 23% 2,7-DMN plus 1-ethylnaphthalene and 34% other isomers of 2,6-DMN. The 2,6-DMN in the cake constitutes 46% of the original 2,6-DMN in the concentrate, and the 2,6-DMN recovery is therefore 46% at this stage. The filtered solids are removed from the press, slurried with an equal volume of ethanol and returned to the press. Pressure of 100 p.s.i.g. is applied to force out ethanol and dissolved hydrocarbons. The temperature is then raised over a 20–30 minute period to 50° C. while maintaining pressure of 100 p.s.i.g. to force out liquid. The solids filtered at 50° C. contain 68% 2,6-DMN, and the recovery is 40%. The solids are then heated in the press, without additional solvent, at 100 p.s.i.g., to 80° C. over a one-hour period. The solids filtered at 80° C. contain 93% 2,6-DMN and 7% 2,7-DMN, and the recovery is 26%, as shown in the table.

In Run E, the concentrate, after heating to obtain complete solution, is chilled at 0° C. for 14 days, then pressed at 200 p.s.i.g. to force out liquid, then heated over about 2½ hours to 80° C. under pressure of 200 p.s.i.g. No solvent is added at any stage. Yield and purity of the solids filtered at 80° C. are shown in the table. The purity of the 2,6-DMN product obtained here, without solvent washing, is inferior to that obtained in Run F, with solvent washing.

In Run H, the concentrate, after heating to obtain complete solution, is cooled to 0° C., then pressed at 100 p.s.i.g. to force out liquid and heated to room temperature while pressing at 100 p.s.i.g. The solids are slurried with an equal volume of ethanol, and the slurry pressed at room temperature to force out liquid and obtain solids at yield and purity shown in the table. The solids are then heated first to 80° C., then to 90° C., at 100 p.s.i.g., to force out liquid and obtain solids at yields and purities as shown in the table.

In Run D, the procedure is essentially the same as in Run E, with a different feed stock as noted and with different pressure as noted previously. Run D differs from Run H in that Run D omits the slurrying with ethanol. Comparison of the Run H and D data for the 80° C. filtered solids shows that, for this feed stock, better yield and purity were obtained without ethanol.

In Run D, filtrate yields and compositions are given for filtration at 0° C. and for filtration over temperature increments of 0 to 20, 20 to 40, 40 to 60 and 60 to 80° C.

In Run B, after crystallizing at 0° C. and pressing at 0° C. and 100 p.s.i.g., the solids contain 37% 2,6-DMN and 28% 2,7-DMN, and the 2,6-DMN recovery is 76%. One-half of the solids are then charged to Run G wherein, after warming to room temperature in the press, an equal volume of methanol is added to the solids, and the slurry pressed at 100 p.s.i.g. to give yield and purity as shown in the table.

In Run C, crystallization at room temperature, pressing at room temperature, heating to 70° C., all without solvent addition and at 75 p.s.i.g., are performed, with the results indicated.

In Run I, the data on filtration at 80° C. are essentially a check on the Run F data on such filtration. The solids are then heated to 90° C. in Run I, with pressing at 100 p.s.i.g., and the yield and purity as shown are obtained.

In Run J, the procedure of Run F and Run I is essentially repeated, using a different feed.

As noted above, Run D without ethanol, gives better results than Run H with ethanol. The difference in effect of ethanol here, as compared with Runs F and E, is believed to be attributable to the difference in feed.

An advantage of the process according to the invention is that highly concentrated isomers can be obtained with only a single crystallization, followed by filtration and heating, provided that the heating is to a sufficiently high temperature, with removal of the liquid formed, as elsewhere specified. Without such filtration, heating and liquid removal, a plurality of crystallizations would be required, and added solvent would be required, in order to obtain the same extent of concentration, and in many instances even a plurality of crystallizations with solvent would not produce as great an extent of concentration as that obtained according to the invention. It is within the scope of the invention to admix with solvent and recrystallize the solid product obtained in the process of the invention, but such procedure is not essential.

The pressing according to the invention can be performed in any suitable manner, e.g. employing air pressure instead of piston pressure as previously disclosed. The air pressure can be transmitted to the solids through a plastic, e.g. polyethylene, membrane, or in any other suitable manner. Any other suitable manner of applying pressure can be employed. Also, in order to increase the pressure differential between the zone in which the solids are retained and the zone into which the liquid is expelled, vacuum can be applied to the latter zone. The pressure differential is preferably in the range from 25 to 500 p.s.i.g.

Solvents for use in the solvent washing and/or solvent crystallization stages, if any, in the process of the invention include aliphatic hydrocarbons, e.g. n-pentane, heptanes, octanes etc.; alcohols such as methanol, isopropanol, amyl alcohols etc.; glycols such as ethylene glycol, propylene glycols etc.; ketones such as acetone, methyl isobutyl ketone; furfural; sulfolanes such as dimethyl sulfolane; sulfoxides such as dimethyl sulfoxide; alkyl cyanides such as acetonitrile etc.; nitro paraffins such as nitromethane, nitroethane, etc. Water can be used as modifying solvent where appropriate. Solvents in which the lower-melting hydrocarbons in the feed stock are soluble to an appreciable extent, e.g. at least one gram per 10 ml. of solvent at 25° C., and which remain liquid at the crystallization temperature employed are generally suitable and can be selected by a person skilled in the art.

The recovery of 2,3-dimethylnaphthalene from aromatic fractions, boiling for example in the range from 510 to 515° F., is accomplished according to the invention by procedure similar to that set forth in the preceding examples, e.g. by crystallization and pressing at 0° C., followed by pressing while heating to 50° C. or other suitable temperature. Other relatively high-melting isomers can be recovered from suitable starting materials by similar procedure; it is understood, however, that the optimum conditions for recovery of the various isomers may vary from isomer to isomer.

The invention claimed is:

1. Process for separating a dimethylnaphthalene isomer from at least one lower-melting isomer thereof which comprises cooling a liquid mixture of the first-named isomer and the second-named isomer to precipitate a crystalline mixture of said first-named isomer and said second-named isomer, separating said crystalline mixture from the mother liquor, heating said crystalline mixture to a temperature which is below the melting point of said first-named isomer and is high enough to melt a portion of said crystalline mixture, while maintaining elevated pressure in the range from 25 to 500 p.s.i.g. on the crystals to force from the crystals, enriched in said first-named isomer, the liquid material comprising said second-named isomer resulting from melting a portion of said crystalline mixture by said heating.

2. Process according to claim 1 wherein said crystalline mixture contains 2,6-dimethylnaphthalene, 2,7-dimethylnaphthalene and lower-melting isomers thereof, the last-named crystals are enriched in 2,6-dimethylnaphthalene and 2,7-dimethylnaphthalene, and said liquid material comprises said lower-melting isomers.

3. Process according to claim 1 wherein said first-named isomer is 2,6-dimethylnaphthalene.

4. Process according to claim 1 wherein said cooling is to a crystallization temperature in the range from −50° C. to 50° C.

5. Process according to claim 4 wherein said heating is to a temperature at least 10° C. higher than said crystallization temperature and in the range from 25° C. to 100° C.

6. Process according to claim 1 wherein said liquid mixture is a hydrocarbon mixture having boiling range of approximately 500 to 510° F. and 2,6-dimethylnaphthalene content in the range from 15 to 30 wt. percent.

7. Process according to claim 6 wherein said liquid mixture is a distillate fraction of an aromatic concentrate from petroleum catalytic gas oil.

8. Process according to claim 1 wherein said first-named isomer is 2,3-dimethylnaphthalene, and said liquid mixture is an aromatic hydrocarbon mixture having boiling range of approximately 510–515° F.

9. Process for recovering 2,6-dimethylnaphthalene from admixture with other isomers which comprises cooling a liquid mixture of said 2,6-dimethylnaphthalene and other isomers, said mixture containing over 20% of 2,6-dimethylnaphthalene to precipitate 2,6-dimethylnaphthalene in crude solid form, separating the crude solid from mother liquor, washing the separated solid with a lower alkanol solvent at a temperature in the range from 0 to 50° C., and heating the washed solid while maintaining elevated pressure in the range from 25 to 500 p.s.i.g. thereon to force from the solid the liquid obtained obtained by liquefying a portion of said washed solid by said heating.

10. Process for separating a dimethylnaphthalene isomer from at least one lower-melting isomer thereof which comprises heating a crystalline mixture of the first-named isomer and the second-named isomer to a temperature which is below the melting point of said first-named isomer and is high enough to melt a portion of said crystalline mixture, while maintaining elevated pressure in the range from 25 to 500 p.s.i.g. on the crystals to force from the crystals, enriched in said first-named isomer, the liquid material comprising said second-named isomer resulting from melting a portion of said crystalline mixture by said heating.

11. Process for recovering 2,6-dimethylnaphthalene from its isomers including 2,7-dimethylnapthalene which comprises cooling a liquid mixture boiling in the range from 500 to 510° F., and containing 15 to 30 wt. percent 2,6-dimethylnaphthalene, to a temperature in the range from −10° C. to 30° C. to crystallize a 2,6-dimethylnaphthalene concentrate; subjecting the resulting slurry to pressure in the range from 50 to 250 p.s.i.g. to force liquid from said concentrate; and heating said concentrate to a temperature in the range from 60 to 90°C. under pressure in the range from 50 to 250 p.s.i.g. to force liquefied material comprising 2,7-dimethylnaphthalene from the solids, thereby increasing the proportion of 2,6-dimethylnaphthalene in the solids.

References Cited by the Examiner

UNITED STATES PATENTS

| | | | |
|---|---|---|---|
| 1,836,211 | 12/31 | Weiland et al. | 260—674 |
| 2,815,364 | 12/57 | Green | 260—674 |
| 2,850,548 | 9/58 | Thelin et al. | 260—674 |
| 2,861,112 | 11/58 | Christensen et al. | 260—674 |
| 2,981,773 | 4/61 | Weedman | 260—674 |

OTHER REFERENCES

Findlay et al.: "Advances in Petroleum Chemistry and Refining," vol. 1, 1958, Interscience Pub. Inc., pp. 119–206 (pp. 148–9 relied on).

ALPHONSO D. SULLIVAN, *Primary Examiner.*